United States Patent
Kataria et al.

(10) Patent No.: US 11,651,254 B2
(45) Date of Patent: May 16, 2023

(54) INFERENCE-BASED INCIDENT DETECTION AND REPORTING

(71) Applicant: INTUIT INC., Mountain View, CA (US)

(72) Inventors: Archana Kataria, Mountain View, CA (US); Sankararaman Chidambaram, Los Angeles, CA (US)

(73) Assignee: INTUIT INC., Mountain View, CA (US)

( * ) Notice: Subject to any disclaimer, the term of this patent is extended or adjusted under 35 U.S.C. 154(b) by 381 days.

(21) Appl. No.: 16/922,421

(22) Filed: Jul. 7, 2020

(65) Prior Publication Data

US 2022/0012602 A1    Jan. 13, 2022

(51) Int. Cl.
  *G06F 11/00* (2006.01)
  *G06N 5/04* (2023.01)
  *G06F 11/07* (2006.01)

(52) U.S. Cl.
  CPC ........... *G06N 5/04* (2013.01); *G06F 11/079* (2013.01); *G06F 11/0751* (2013.01); *G06F 11/0769* (2013.01)

(58) Field of Classification Search
  CPC .................................................. G06F 11/079
  See application file for complete search history.

(56) References Cited

U.S. PATENT DOCUMENTS

| | | | |
|---|---|---|---|
| 11,593,694 B1* | 2/2023 | Ananthakumar | G06N 20/00 |
| 2011/0087924 A1* | 4/2011 | Kandula | G06F 11/0709 |
| | | | 714/E11.029 |
| 2011/0214020 A1* | 9/2011 | Caspi | H04L 41/064 |
| | | | 714/E11.029 |
| 2015/0074035 A1* | 3/2015 | Narasappa | G06N 7/01 |
| | | | 706/52 |
| 2015/0358208 A1* | 12/2015 | Jewell | G06F 11/0784 |
| | | | 709/224 |
| 2017/0017537 A1* | 1/2017 | Razin | G06F 11/0709 |
| 2017/0034018 A1* | 2/2017 | Parandehgheibi | H04L 67/12 |
| 2017/0075744 A1* | 3/2017 | Deshpande | H04L 41/0631 |
| 2019/0325514 A1* | 10/2019 | Hong | G06Q 40/03 |
| 2019/0370610 A1* | 12/2019 | Batoukov | G06F 11/0793 |
| 2020/0117734 A1* | 4/2020 | Sylos | G06F 40/30 |
| 2020/0409825 A1* | 12/2020 | Balasubramanian | |
| | | | G06F 11/302 |
| 2021/0026723 A1* | 1/2021 | Nadger | G06F 11/0709 |
| 2021/0349772 A1* | 11/2021 | Kordjazi | G06F 11/302 |
| 2021/0350250 A1* | 11/2021 | Sethi | G06N 20/00 |
| 2022/0138561 A1* | 5/2022 | Prendki | G06N 3/08 |
| | | | 706/12 |

* cited by examiner

*Primary Examiner* — Loan L. T. Truong
(74) *Attorney, Agent, or Firm* — DLA Piper LLP (US)

(57) ABSTRACT

Systems and methods that may be used to provide an inference-based incident detection and reporting process. In one or more embodiments, an inference model may be used to track and analyze changes and incident data from various sources of record to quickly predict potential sources of errors and help focus in on the root cause of a software incident.

14 Claims, 6 Drawing Sheets

| | Event Type | Change # | Start | End | Owner | Description | CI | Asset Alias | Dependency | Suspect Score |
|---|---|---|---|---|---|---|---|---|---|---|
| 430 | Data | CHG0930222 | 05-06-2020 10: | 05-08-2020 11:0 | vfeinstein | finish removal from main db of graveyard'ed terminated test companies and finish UserActivities purge | Intuit Online Payroll (IOP) | | Self | 38.949653 |
| 432 | Netgenie | CHG0933977 | 05-06-2020 11: | 05-07-2020 12:0 | netgenie.soap | NetGenie - Create DNS - qba-matchmaking-ui-profile-qal.ap p.intuit.com | API Gateway | | Yes | 0.480977 |
| 434 | Netgenie | CHG0933976 | 05-06-2020 11: | 05-07-2020 12: | netgenie.soap | NetGenie – Create DNS - qba-matchmaking-ui-profile-e2e.ap p.intuit.com | API Gateway | | Yes | 0.480959 |
| 436 | Netgenie | CHG0933938 | 05-06-2020 10: | 05-06-2020 10:3 | netgenie.soap | NetGenie DNS – Update DNS Request – DNS Name: verifydns.api.intuit.com | API Gateway | | Yes | 0.431097 |
| 438 | SSL | CHG0933133 | 05-06-2020 9:0 | 05-07-2020 9:42 | netgenie.soap | NetGenie Cert Management: Certificate creation } cn:test-update-ng.intuit.com | Venafi Encryption Director | | Yes | 0.395908 |
| 440 | SSL | CHG0933130 | 05-06-2020 9:0 | 05-07-2020 9:41 | netgenie.soap | NetGenie AWS SSL Manager: ACM Resource Creation | Venafi Encryption Director | | Yes | 0.39567 |
| 442 | SSL | CHG0932600 | 05-06-2020 9:1 | 05-06-2020 9:51 | netgenie.soap | NetGenie AWS SSL Manager: ACM Resource Cert Renewal | QuickBooks Online Edition (QBO) | | Yes | 0.39378 |
| 444 | Release | CHG0933802 | 05-06-2020 8:0 | 05-06-2020 11:5 | DSIEGEL1 | iUX iam-account-manager-ui 1.35.x plugin release to production | Identity User eXperience (iUX) | | Yes | 0.352403 |

Incident Tracker [APP] 6:07 PM
Hello from Incident Genie 👋
↻ Here are the predictions for INC0916910
In the last [24 hours:]

510

1. Found 1 changes, 0 observed changes and 0 incidents for [CRM Services]

⇩ Active Incidents on Dependencies:

No Active Incidents on Dependencies

⇩ Recorded Changes and Resolved Incidents on Dependencies:

1. Found 0 changes, 2 observed changes and 0 incidents for [Intuit.moneymovementpayments.realtimerulesengine]

530

[now] Data for Decisions

Want to understand how does this work? Click for more info ← 526

FIG. 5

INFERENCE-BASED INCIDENT DETECTION AND REPORTING

BACKGROUND

The current software development trend has been to deconstruct what used to be large source code files into multiple smaller discrete files. For example, software developed using Amazon® Web Services (AWS) may now use containers and monoliths as building blocks for a larger application or online service. Since a monolith may include multiple services and or functions, it is now common to decompose monoliths into individual microservices (e.g., one microservice for each service/function within the original monolith). One benefit of doing so is that the microservices can scale and be updated independently of the other microservices. These trends help the developer and or online service provider to release code quickly to meet market needs.

This increased speed, however, comes with a few challenges. With so many abstraction layers at play, when a service has an outage or other issues (referred to herein as an "incident"), software engineers and or other personnel often struggle to determine the root cause of the incident. According to Gartner® research, 85% of performance incidents can be traced back to changes made during an upgrade or recent deployment. Fixing the problem as soon as possible is often necessary to prevent customer dissatisfaction and or a breach of a service level agreement.

Many times, however, the change was not made to the failing service, making it more difficult to uncover the error and resolve the incident. For example, a small change in an authentication header might break or introduce an error in a downstream service. The downstream service, which was not changed, may have no idea of the upstream change that may cause it to fail. Moreover, by focusing on the downstream service, the engineers and or other personnel may waste valuable time and resources before finding the real source of the failure, which is undesirable. Accordingly, there is a need and desire for a better mechanism for isolating the source of a software incident and to reduce the mean time to resolve (MTTR) the incident.

BRIEF DESCRIPTION OF THE FIGURES

FIG. 4 shows an example inference spreadsheet report that may be created during the inference-based incident detection and reporting process according to an embodiment of the present disclosure.

FIG. 5 shows an example incident genie output that may be output during the inference-based incident detection and reporting process according to an embodiment of the present disclosure.

DETAILED DESCRIPTION OF SEVERAL EMBODIMENTS

Embodiments described herein may be used to provide an inference-based incident detection and reporting system and process. In one or more embodiments, an inference model or prediction engine may be used to track and analyze changes and incident data from various sources of record (e.g., from an application to infrastructure) to quickly predict potential sources of errors (referred to herein as "change suspects") and help focus in on the root cause of an incident. As can be appreciated, this may also help reduce service restoration times, preserving service obligations and reducing customer impact. In one or more embodiments, inference-based incident detection and analysis may be reported and output in the form of an "incident genie," which may be a software robot (also known as a "bot" such as e.g., a slackbot) or some other form of visual reporting mechanism.

Figure 1:
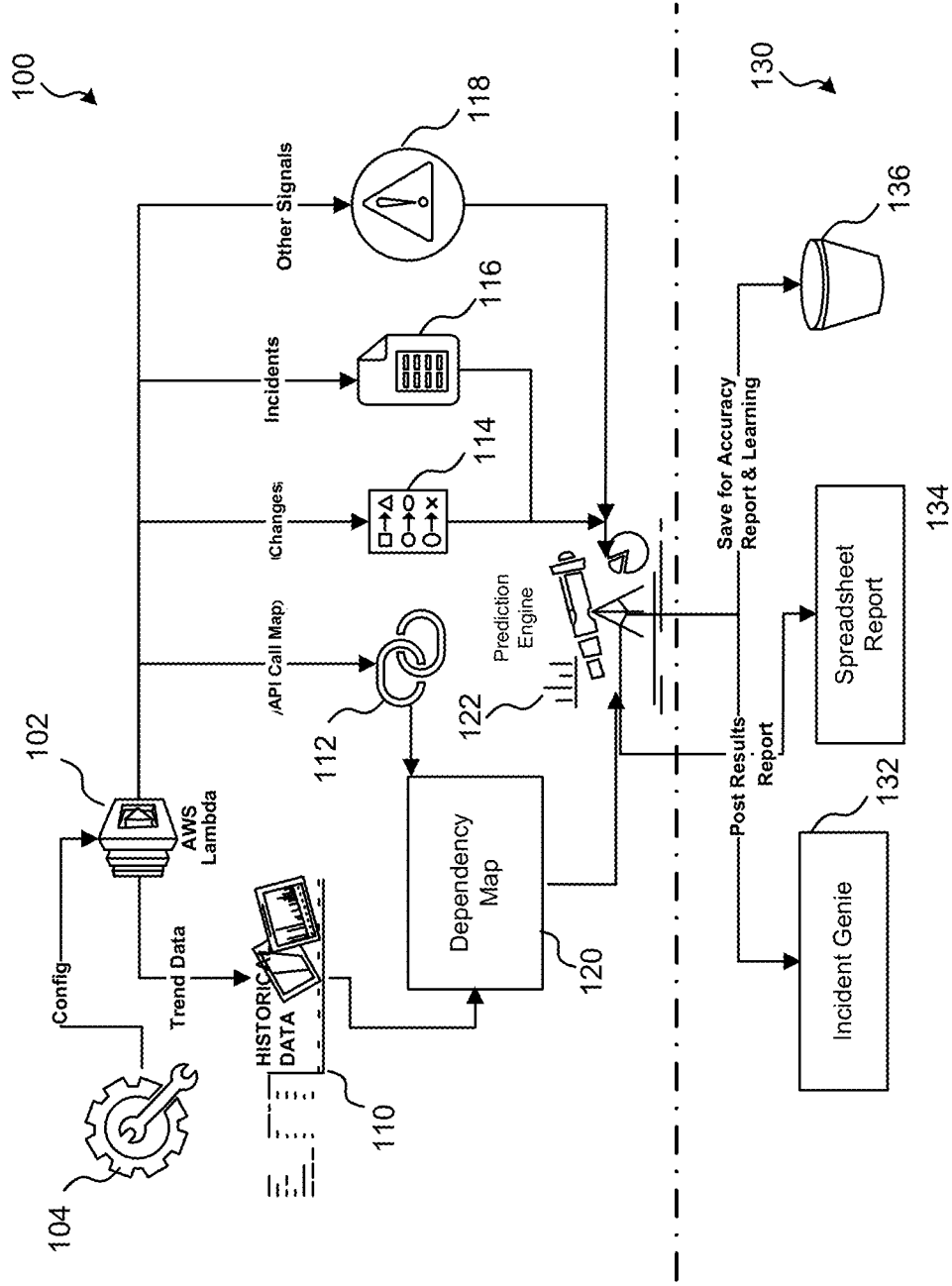
FIG. 1 shows a functional block diagram of an example inference-based incident detection and reporting system in accordance with an embodiment of the present disclosure.

FIG. 1 shows a functional block diagram of an example inference-based incident detection and reporting system 100 in accordance with an embodiment of the present disclosure. In one embodiment, the system 100 may be implemented using the Lambda platform 102 offered as part of the Amazon® Web Services (AWS). AWS Lambda is an event-driven, serverless computing platform that runs code in response to events and may automatically manage the computing resources required by that code. While the disclosed embodiments are described as being used with AWS Lambda, it should be appreciated that any event-driven and or other software platform may be used to perform the processing disclosed herein. The platform 102 may input configuration data from a configuration file 104 to perform some or all of the processing disclosed herein. In one or more embodiments, the configuration data is received by a caller (e.g., personnel reporting the incident) and may include: the name of the service or application being affected, the time of the incident, and or the channel information to post the system output to.

The system 100 may accept data and other input values regarding an ongoing incident and or past incidents in various ways. For example, in the illustrated example, the system 100 may input and process various forms of data and signals using a historical data processing module 110, an API data processing module 112, a changes processing module 114, an incidents processing module 116, other signals processing module 118, dependency map module 120, and an inference-based prediction engine 122.

For example, the historical data processing module 110 may input historical and or trend data concerning one or more prior incidents reported to and or processed by the system 100. In one or more embodiments, the data may be aggregated and input from a digital workflow platform such as ServiceNow®. In one or more embodiments, the historical data processing module 110 may input incident and other data for a pre-determined period such as e.g., the past year. It should be appreciated that a longer period (e.g., two years or more) or a shorter period (e.g., six months) could be used and that the disclosed principles are not limited to using only one year's worth of historical data. The raw and or derived historical data may be output from the historical data processing module 110 to the dependency map module 120.

The API data processing module 112 may use API calls to collect relevant incident and or other data. The API data processing module 112 may implement an event tracker to receive and process detected changes in the microservices, system infrastructure, to name a few. The detected changes data may be output from the API data processing module 112 to the dependency map module 120.

The dependency map module 120 may be used to create a dependency map. In one or more embodiments, the map may include one or more dependency scores based on the data collected from the historical data processing module 110 and the API data processing module 112. With the service impacted in context, the goal is to find all of the dependencies to obtain a complete list of upstream services that could be causing the incident as explained below in more detail.

The changes processing module 114, incidents processing module 116, and other signals processing module 118 may provide additional information that may be fed to the inference-based prediction engine 122. For example, these modules may be used to collect more information about the dependencies based on recent information. In one or more embodiments, recent information is information within a pre-determined "recency period" such as e.g., within the past 24 hours. It should be appreciated, however, that a longer recency period (e.g., two days or more) or a shorter recency period (e.g., 12 hours) could be used and that the disclosed principles are not limited to using and analyzing information from the past 24 hours.

In accordance with the disclosed principles, the changes processing module 114 may be used to review reported changes by software developers to determine if there were any recent changes and, if so, when the changes were introduced. The incidents processing module 116 may determine if there are any active incidents with the dependencies, if there were any recent resolved incidents with these dependencies, and when they happened. The other signals processing module 118 may be used to input and processing any other information deemed suitable to evaluate an incident and its dependencies. In one or more embodiments, other signals may include: health signals, critical alerts fired from the service, a health check URL, to name a few.

Information and data from the dependency map and the additional information provided by the changes processing module 114, incidents processing module 116, and other signals processing module 118 may be provided to the inference-based prediction engine 122. In one embodiment, the inference-based prediction engine 122 may use the collected data, the dependencies, changes and or incidents to generate a series of scores (discussed below in more detail) for all of the services in the dependency map. The inference-based prediction engine 122 may use these scores to determine which service is highly likely to be the cause of the incident, which may then be reported in one or more way. In one or more embodiments, the prediction engine performs a multiple criteria analysis using a weighted sum method (described in more detail below).

For example, FIG. 1 illustrates example outputs 130 that may be generated by the inference-based incident detection and reporting system 100. The outputs 130 may include an incident genie 132 (in the form of a slackbot), a spreadsheet report 134 (e.g., Google Sheets, Excel, etc.) and or the storage of incident data, analysis and or predictions in a storage medium 136 (e.g., an AWS bucket). Each output 130 provides information in a different way and thus, all three outputs may be desirable.

For example, and as discussed below in more detail with respect to FIG. 4, the spreadsheet report 134 may be used to visualize the details of the incident data and dependency data in a tabular form, which may help system or other personnel evaluate how the inference-based prediction engine 122 made its inferences/predictions. In one embodiment, the stored incident data, analysis and or predictions in the storage medium 136 may be used for further evaluation and or training of the inference-based prediction engine 122 or other models used in the system for incident analysis. For example, after the root cause of the incident has been determined and corrected, the service personnel may update the incident ticket, which may validate the recommendation/prediction of the inference-based prediction engine 122. This information can be used as part of a self-learning model to provide more accurate predictions in the future.

In one embodiment, as discussed below in more detail with respect to FIG. 5, the incident genie 132 may provide a visual summary of the inference-based prediction engine's 122 analysis, making it easy for system or other personnel to act on the incident. The incident genie 132 may also provide the personnel an opportunity to request more information or details via e.g., interactive links and or selectors.

Figure 2:
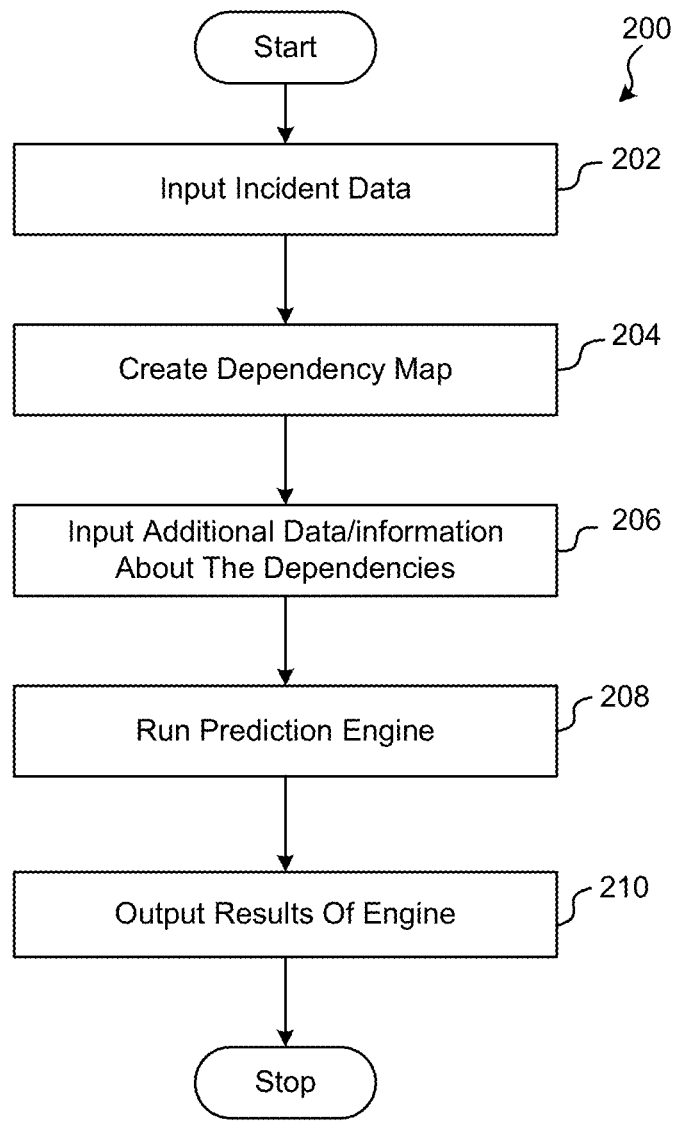
FIG. 2 shows an example inference-based incident detection and reporting process in accordance with an embodiment of the present disclosure.

FIG. 2 shows an example inference-based incident detection and reporting process 200 in accordance with an embodiment of the present disclosure. The process 200 may be run on one or more computing devices such as the computing device 600 illustrated in FIG. 6 (discussed below in more detail). In one or more embodiments, the process 200 may use services provided by the AWS Lambda platform or other similar platforms.

At step 202, the process 200 may input incident data such as historical and or trend data concerning one or more prior incidents reported to and or processed by the system 100 (e.g., data output from the historical data processing module 110). The process 200 may also input detected changes data (e.g., data output from the API data processing module 112).

At step 204, the process 200 may create a dependency map based on the data input at step 202. In one or more embodiments, the map may include one or more dependency scores that may be used to find all of the dependencies and to generate a complete list of upstream services that could be causing the incident. In one or more embodiments, the dependency map may be a list or table containing the processed data. In one or more embodiments, a graphical dependency map may also be generated, which may be used by system or other personnel to view the dependencies of a service that could be the true cause of the incident.

Figure 3:
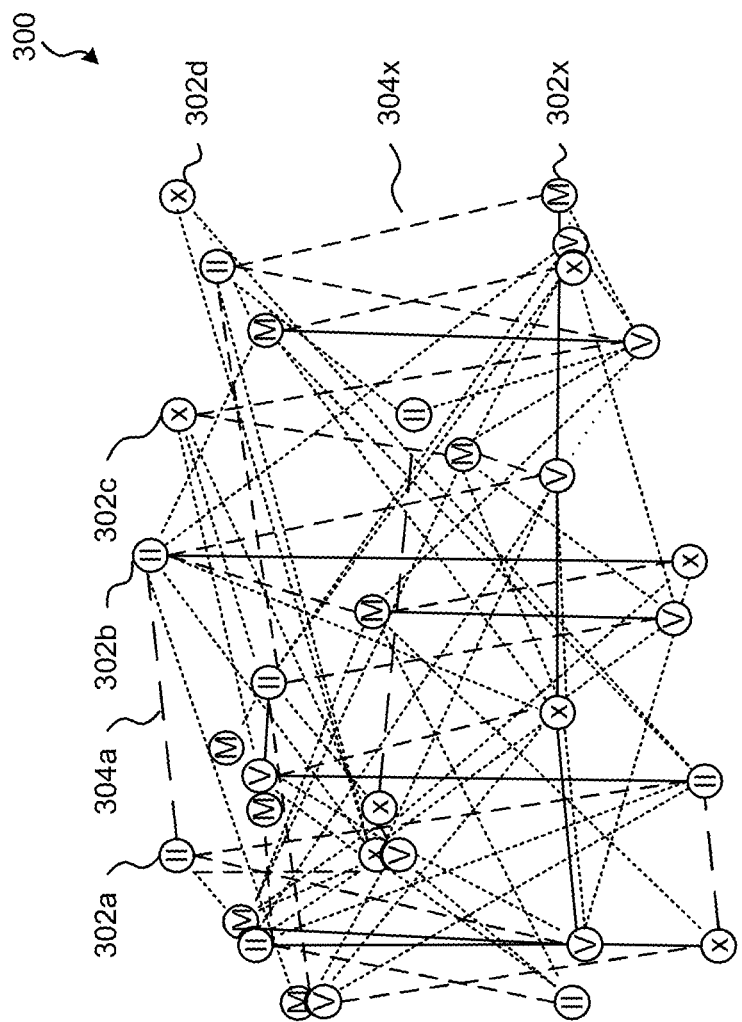
FIG. 3 shows an example dependency map that may be created during the inference-based incident detection and reporting process according to an embodiment of the present disclosure.

FIG. 3 shows an example dependency map 300 that may be created during the inference-based incident detection and reporting process 200 according to an embodiment of the present disclosure. The illustrated map 300 comprises a plurality of nodes 302a, 302b, 302c, 302x and links 304a, 304x. The nodes 302a, 302b, 302c, 302x may correspond to a particular service such as the service reporting the incident and various other services such as the dependent services discussed above. The links 304a, 304x illustrate connections between the services to show how they may be dependent upon another service. While not required, the map 300 may be illustrated to the user so that it may be evaluated, if desired. The data and information used to generate the map 300 may be stored in a database or table, which may be used in the processing described below and or separately evaluated.

Referring again to FIG. 2, at step 206, the process 200 may input and collect additional data and or information about the dependencies. In one or more embodiments, the data and information may be collected from the changes processing module 114, incidents processing module 116, and other signals processing module 118. In one or more embodiments, the data and information collected may be within a predetermined recency period (e.g., within the past 24 hours). This data may be referred to as "recent data" and the information may be referred to as "recent information." The input data and information may be used to determine if there were any changes recently and, if so, when the change or changes were introduced. The input data information may be used to determine if there are any active incidents associated with these dependencies. In addition, or alternatively, the input data and information may be used to determine if there any recently resolved incidents associated with these dependencies and, if so, when that happened.

With the service impacted in context, it is desirable to find all of its dependencies based on the past events and other data and information collected at step 206. As can be appreciated, this may provide the process 200 with a complete list of upstream services that could be causing the incident. The list may contain all of the changes and incidents associated with those services within the predetermined recency period (e.g., the last 24 hours), including the service impacted. As noted above, a longer recency period (e.g., two days or more) or a shorter recency period (e.g., 12 hours) could be used and that the disclosed principles are not limited to using and analyzing data and information from the past 24 hours.

At step 208, the prediction engine may be run on all the collected data and information of the prior steps (e.g., steps 202 to 206). In one or more embodiments, the collected information may be used to find a "Change Score", "Dependency Score", and an "Incident Score" for all the services in the dependency map. In one or more embodiments, a "Total Change Score" may be calculated as the sum of all of the Change Scores and a "Total Incident Score" may be calculated as the sum of all of the Incident Scores. In one or more embodiments, a "Total Score" may be calculated as the sum of the Total Change Score and the Total Incident Score. In one or more embodiments, a "Grand Score"=(Total Change Score+Total Incident Score)/Total Score.

A Grand Score may be calculated for each dependency. Thus, every service in the dependency map will have a Grand Score between 0 and 100. The sum of all of the Grand Scores should always be 100 (e.g., 100%). For example, if the dependency map includes a SyncService, Signup, Authentication, and Feeder services, a total "Service Grand Score" may be: SyncService=45, Signup=34, Authentication=18, and Feeder=3. As can be appreciated, the largest Grand Score should indicate which service is highly likely to be the cause of the incident. In this example, that service would be SyncService.

In one or more embodiments, the scoring process provide weights to the data and information on the dependency list. For example, three features may be determined and weighed separately and a weighted average value may be generated during step 208 and used in subsequent processing to determine the Grand Scores. In one or more embodiments, the features to be considered may be: 1) dependencies; 2) changes to the impacted service and dependencies in the predetermined recency period; and 3) incidents on the dependencies in the predetermined recency period. In one or more embodiments, the service with the highest score is the service most likely causing the incident.

At step 210, the result of the prediction engine (e.g., the Service Grand Score) is output in one or more ways. As discussed above with respect to FIG. 1, these outputs may include one or more of an incident genie (in the form of a slackbot), a spreadsheet report (e.g., Google Sheets, Excel, etc.) and or the storage of incident data, analysis and or predictions in a storage medium (e.g., an AWS bucket). As can be appreciated, each output provides data and information in a different way and thus, all three outputs may be desirable.

If the prediction engine's output is pushed to the incident genie disclosed herein, data and information is provided on a user interface such that a user, maintenance and or other personnel may dig deep into the potential cause of the incident (i.e., the suspects) in a graphical and or interactive manner. In one or more embodiments, the output may also be available in the JSON (JavaScript Object Notation) format, which is a lightweight format for storing and transporting data. JSON is often used when data is sent from a server to a web page. Thus, the disclosed principles are tool agnostic. In an example, if the service Signup is the service with the reported incident, it is possible that the prediction engine may generate an output that is pushed to the incident genie that reports the following data and information:

SyncService—7 changes and 1 incident—45% chance to break
Signup Signup—1 change 0 incidents—34% chance to break
Signup Authentication—2 changes 0 incidents—18% chance to break
Signup Feeder—0 changes and 1 incident—3% chance to break Signup Similar and or additional data and information may be stored in the spreadsheet report and or stored in the storage medium. In one embodiment, the stored incident data, analysis and or predictions in the storage medium 136 may be used for further evaluation and or training of the inference-based prediction engine 122 or other models used in the system for incident analysis. For example, after the root cause of the incident has been determined and corrected, the service personnel may update the incident ticket, which may validate the recommendation/prediction of the inference-based prediction engine 122. This information can be used as part of a self-learning model to provide more accurate predictions in the future.

The spreadsheet report may be used to visualize the details of the incident data and dependency data in a tabular form, which may help system or other personnel evaluate how the inference-based prediction engine made its inferences/predictions. An example of such a report 400 is illustrated in FIG. 4. In the illustrated example, the report 400 comprises a plurality of columns 402, 404, 406, 408, 410, 412, 413, 416, 418, 420 and a plurality of rows 430, 432, 434, 436, 438, 430, 442, 444.

Column 402 may be used to show an event type (e.g., data, Netgenie, SSL, release, etc.). Column 404 may be used to show a change number as reported by the system or user. Column 406 may be used to show the start time of the event and column 408 may be used to show the end time of the event. Column 410 may be used to show the owner associated with the event and or service effected. Column 412 may be used to show a description of the event. Column 414 may be used to show the configuration item ("CI"), which is another way to refer to the application and or service. Column 416 may be used to show the asset's alias, if any. Column 418 may be used to show whether the service listed is the incident service (i.e., self) or a dependency (i.e., yes). Column 420 may be used to show the suspect score (i.e., Grand Score) discussed above.

As can be appreciated, the spreadsheet report 400 contains additional details of events that may be related to the reported incident. Thus, the spreadsheet report 400 may provide another mechanism for determining the root cause of the incident and correcting it.

FIG. 5 shows an example incident genie output 500 that may be output during the inference-based incident detection and reporting process 200 according to an embodiment of the present disclosure. In one embodiment, when an incident is reported, a slack channel is automatically created and all necessary information may be added to the channel. In the illustrated embodiment, the incident genie output 500 may include a header portion 501 that may be used to alert the user of the contents of the output 500. For example, the header portion 501 may contain a first field 502 describing what is being shown on the output 500 (e.g., "Incident Tracker"). The header portion 501 may contain a second field 504 providing a greeting (e.g., "Hello from Incident Genie") or other introductory or instructional message for the user. The header portion 501 may contain a third field 506 providing a message identifying the incident the output 500 is related to (e.g., "Here are the predictions for INC0916910"). In addition, the header portion 501 may contain a fourth field 508 providing a timeframe for the information in the report (e.g., "In the last 24 hours"). As can be appreciated, the illustrated timeframe should be the same as the recency period discussed above.

The output 500 may also include an incident information portion 510 providing the data and information determined by the prediction engine 122 and other data and information gathered and or processed during the inference-based incident detection and reporting process 200. In the illustrated example, the information portion 510 includes a first field 511 providing change and or incident data and information related to the incident (e.g., "Found 1 changes, 0 observed changes and 0 incidents for CRM Services").

In accordance with the disclosed principles, the information portion 510 may contain data and information about dependencies. For example, in the illustrated example, the information portion 510 includes a second field 512 indicating that information about active incidents for the dependencies is forthcoming (e.g., "Active Incidents on Dependencies:"). The example information portion 510 includes a third field 514 providing the number of active incidents for the dependencies (e.g., "No active Incidents on Dependencies").

In the illustrated example, the information portion 510 includes a fourth field 516 indicating that information about recorded changes and or resolved incidents for the dependencies is forthcoming (e.g., "Recorded Changes and Resolved Incidents on Dependencies:"). The example information portion 510 includes a fifth field 518 providing the number of recorded changes, observed changes and or resolved incidents for a dependency (e.g., "Found 0 changes, 2 observed changes and 0 incidents for") and a sixth field 520 identifying the dependency (e.g., "Intuit.moneymovementpayments.realtimerulesengine".

In accordance with the disclosed principles, the output 500 may also include an underlying data portion 530 allowing the user to interact with the output 500 and obtain underlying data or information for what has been shown in the output 500. In the illustrated example, underlying data portion 530 may include a first field 532 identifying the portion 530 as "Data for Decisions." The underlying data portion 530 may also include a second filed 534 asking the user if she wants to understand how the incident genie works (e.g., "Want to understand how does this work?") and a selector 526 for the user to obtain more information (e.g., "Click for more info").

Figure 6:
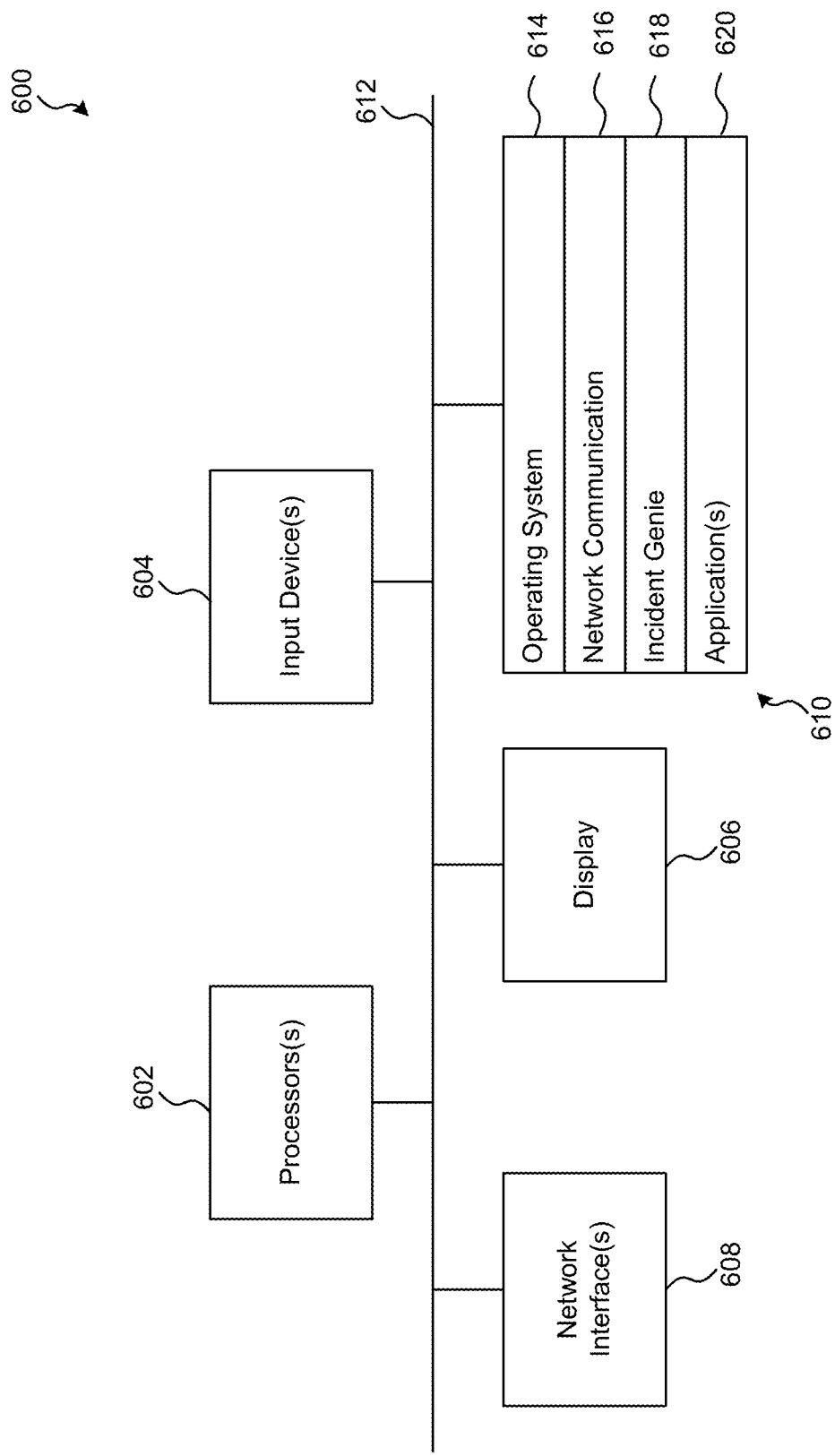
FIG. 6 shows a computing device according to an embodiment of the present disclosure.

FIG. 6 is a block diagram of an example computing device 600 that may implement various features and processes as described herein. The computing device 600 may be any electronic device that runs software applications derived from compiled instructions, including without limitation servers, personal computers, smart phones, media players, electronic tablets, game consoles, email devices, etc. In some implementations, the computing device 600 may include one or more processors 602, one or more input devices 604, one or more display devices 606, one or more network interfaces 608, and one or more computer-readable media 610. Each of these components may be coupled by a bus 612.

Display device 606 may be any known display technology, including but not limited to display devices using Liquid Crystal Display (LCD) or Light Emitting Diode (LED) technology. Processor(s) 602 may use any known processor technology, including but not limited to graphics processors and multi-core processors. Input device 604 may be any known input device technology, including but not limited to a keyboard (including a virtual keyboard), mouse, track ball, and touch-sensitive pad or display. Bus 612 may be any known internal or external bus technology, including but not limited to ISA, EISA, PCI, PCI Express, USB, Serial ATA or FireWire. Computer-readable medium 610 may be any medium that participates in providing instructions to processor(s) 602 for execution, including without limitation, non-volatile storage media (e.g., optical disks, magnetic disks, flash drives, etc.), or volatile media (e.g., SDRAM, ROM, etc.).

Computer-readable medium 610 may include various instructions 614 for implementing an operating system (e.g., Mac OS®, Windows®, Linux). The operating system may be multi-user, multiprocessing, multitasking, multithreading, real-time, and the like. The operating system may perform basic tasks, including but not limited to: recognizing input from input device 604; sending output to display device 606; keeping track of files and directories on computer-readable medium 610; controlling peripheral devices (e.g., disk drives, printers, etc.) which can be controlled directly or through an I/O controller; and managing traffic on bus 612. Network communications instructions 616 may establish and maintain network connections (e.g., software for implementing communication protocols, such as TCP/IP, HTTP, Ethernet, telephony, etc.).

Personalized behavioral-based nudges instructions 618 may include instructions that implement the behavioral-based personalized nudges process described herein. Application(s) 620 may be an application that uses or implements the processes described herein and/or other processes. The processes may also be implemented in operating system 614.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

As can be appreciated, the disclosed systems and processes provide several advantages over conventional incident management services and tools. For example, current incident management services and tools do not process incident data or other information such as changes, alerts etc. and make inferences/predictions such as the ones made in accordance with the disclosed principles. Moreover, none of the conventional incident management services or tools analyze dependencies of the service under investigation and thus, are incapable of finding the root cause of the reported incident. Indeed, this is only achievable using the system 100 and process 200 disclosed herein.

Specifically, the disclosed pre-processing of data sets and use of an inference model as disclosed herein in is completely novel. Moreover, the displaying of suspects in the context of live running incidents is also unique to the disclosed principles. Conventional incident management services and tools simply display information without providing a consolidated view and or a single screen view indicating what the information actually means (i.e., they do not provide a single screen view of the true cause of the incident). In short, conventional incident management services and tools provide metrics, while the disclosed principles provide analytics and recommendations that help the service personnel and other personnel narrow down which area to focus on, which reduces the mean time to resolve (MTTR) the incident.

The disclosed principles identify the "top suspects" when an incident is reported/created. When the appropriate personnel utilizes the disclosed principles to find the "actual" service causing the incident, it may be compared to incident data and recorded and or output in several ways, which may be used for training and other purposes. As can be appreciated, the disclosed principles may reduce the possibility that the service provider will waste man-power, resources, time and/or money chasing down the wrong problem. As such, the disclosed systems and processes are an advancement in the software incident management and resolution technical fields. Specifically, the disclosed principles provide a technological solution to a technological problem attributable to computers and computer processing.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A computer implemented method for detecting and reporting a software incident associated with a first service, said method being performed on a computing device, said method comprising:
   inputting data associated with the incident;
   inputting historical data concerning one or more prior incidents;
   creating a dependency map based on the input data and historical data, the dependency map identifying one or more additional services in which the first service may be dependent upon;
   inputting additional data associated with the one or more additional services identified in the dependency map;
   running the additional data through an inference-based prediction engine to determine which service from the first service and the one or more additional services is a predicted cause of the software incident, wherein determining which service is the predicted cause of the software incident comprises:
      determining a change score, a dependency score, and an incident score associated with each of the first service and the one or more additional services;
      weighing the change score, dependency score, and an incident score separately to generate a weighted average value;
      determining a grand score for each of the first service and the one or more additional services based on the weighted average value of a respective change score, dependency score, and an incident score;
      selecting the service from the first service and the one or more additional services having a largest grand score as the service determined to be the predicted cause of the software incident; and
   outputting information concerning the service determined to be the predicted cause of the software incident.

2. The method of claim 1, wherein outputting the information concerning the service determined to be the predicted cause of the software incident comprises:
   initiating an incident genie; and
   outputting the information concerning the service determined to be the predicted cause of the software incident via the incident genie.

3. The method of claim 2, wherein the incident genie comprises an information portion, and outputting the information concerning the service determined to be the predicted cause of the software incident comprises:
   outputting, in the information portion, first information concerning the first service; and
   outputting, in the information portion, second information concerning the service determined to be the predicted cause of the software incident.

4. The method of claim 1, wherein outputting the information concerning the service determined to be the predicted cause of the software incident comprises outputting a report comprising incident and or change data regarding the first service and the one or more additional services.

5. The method of claim 1, wherein outputting the information concerning the service determined to be the predicted cause of the software incident comprises outputting incident and change data regarding the first service and the one or more additional services to a data bucket for further evaluation.

6. The method of claim 1, wherein inputting data associated with the incident comprises inputting change and incident data about the first service from within a first predetermined period and inputting historical data concerning one or more prior incidents comprises inputting change and incident data about the first service from within a second predetermined period.

7. The method of claim 6, wherein inputting additional data associated with the one or more additional services identified in the dependency map comprises inputting change and incident data about the one or more additional services from within the first predetermined period.

8. A system for detecting and reporting a software incident associated with a first service, said system comprising:
   a first computing device connected to a second computing device through a network connection, the first computing device configured to:
   input data associated with the incident;
   input historical data concerning one or more prior incidents;
   create a dependency map based on the input data and historical data, the dependency map identifying one or more additional services in which the first service may be dependent upon;
   input additional data associated with the one or more additional services identified in the dependency map;
   run the additional data through an inference-based prediction engine to determine which service from the first service and the one or more additional services is a predicted cause of the software incident, wherein determining which service is the predicted cause of the software incident comprises causing the first computing device to:
      determine a change score, a dependency score, and an incident score associated with each of the first service and the one or more additional services;
      weigh the change score, dependency score, and an incident score separately to generate a weighted average value;
      determine a grand score for each of the first service and the one or more additional services based on the weighted average value of a respective change score, dependency score, and an incident score;
      select the service from the first service and the one or more additional services having a largest grand score as the service determined to be the predicted cause of the software incident; and
   output information concerning the service determined to be the predicted cause of the software incident.

9. The system of claim 8, wherein the first computing device is
   configured to output the information concerning the service determined to be the
   predicted cause of the software incident by:
   initiating an incident genie; and
   outputting the information concerning the service determined to be the predicted cause of the software incident via the incident genie.

10. The system of claim 9, wherein the incident genie comprises an information portion, and outputting the information concerning the service determined to be the predicted cause of the software incident comprises:
    outputting, in the information portion, first information concerning the first service; and
    outputting, in the information portion, second information concerning the service determined to be the predicted cause of the software incident.

11. The system of claim 8, wherein the first computing device is configured to output the information concerning the service determined to be the predicted cause of the software incident by outputting a report comprising incident and or change data regarding the first service and the one or more additional services.

12. The system of claim 8, wherein the first computing device is configured to output the information concerning the service determined to be the predicted cause of the software incident by outputting incident and change data regarding the first service and the one or more additional services to a data bucket for further evaluation.

13. The system of claim 8, wherein the first computing device is configured to input data associated with the incident by inputting change and incident data about the first service from within a first predetermined period and is configured to input historical data concerning one or more prior incidents by inputting change and incident data about the first service from within a second predetermined period.

14. The system of claim 13, wherein the first computing device is configured to input additional data associated with the one or more additional services identified in the dependency map by inputting change and incident data about the one or more additional services from within the first predetermined period.

* * * * *